(12) United States Patent
Bjontegaard et al.

(10) Patent No.: US 9,693,057 B2
(45) Date of Patent: Jun. 27, 2017

(54) INTEGER TRANSFORM VIDEO COMPRESSION SYSTEM, METHOD AND COMPUTER PROGRAM PRODUCT

(71) Applicant: CISCO TECHNOLOGY, INC., San Jose, CA (US)

(72) Inventors: Gisle Bjontegaard, Oppegard (NO); Arild Fuldseth, Lysaker (NO)

(73) Assignee: Cisco Technology, Inc., San Jose, CA (US)

( * ) Notice: Subject to any disclaimer, the term of this patent is extended or adjusted under 35 U.S.C. 154(b) by 654 days.

(21) Appl. No.: 14/051,020

(22) Filed: Oct. 10, 2013

(65) Prior Publication Data

US 2014/0037012 A1    Feb. 6, 2014

Related U.S. Application Data

(63) Continuation of application No. 12/987,246, filed on Jan. 10, 2011, now Pat. No. 8,576,914.

(51) Int. Cl.
*H04N 19/625*    (2014.01)
*H04N 19/61*    (2014.01)
*H04N 19/00*    (2014.01)
*G06F 17/14*    (2006.01)

(52) U.S. Cl.
CPC ......... *H04N 19/008* (2013.01); *G06F 17/147* (2013.01); *H04N 19/619* (2014.11); *H04N 19/625* (2014.11)

(58) Field of Classification Search
None
See application file for complete search history.

(56) References Cited

U.S. PATENT DOCUMENTS

| | | |
|---|---|---|
| 8,331,454 B2 | 12/2012 | Bjontegaard et al. |
| 2002/0111979 A1 | 8/2002 | Sun |
| 2007/0083883 A1 | 4/2007 | Deng |
| 2009/0122861 A1 | 5/2009 | Bjontegaard et al. |

FOREIGN PATENT DOCUMENTS

WO    2009/064193 A1    5/2009

OTHER PUBLICATIONS

International Search Report and Written Opinion issued Apr. 16, 2012 for PCT/IB2012/050095.
English translation of First Office Action in corresponding Chinese Application No. 201280004952.X, issued Sep. 1, 2015, 7 pages.

*Primary Examiner* — Anner Holder
*Assistant Examiner* — William Adrovel (57) ABSTRACT

A video coding/decoding system, method and computer program product employ an integer transform matrix for transforming to/from transform coefficients and residual pixel data in moving pictures by a set of semi-orthonormal basis vectors. The basis vectors are derived from conventional DCT or KTL matrixes, but relaxes to some extent the requirements for orthogonality, norm equality and element size limitation. In this way improved coding efficiency and lower complexity compared to previously used integer transforms are possible.

16 Claims, 4 Drawing Sheets

INTEGER TRANSFORM VIDEO COMPRESSION SYSTEM, METHOD AND COMPUTER PROGRAM PRODUCT

CROSS-REFERENCE TO RELATED APPLICATION

This application is a Continuation of and is based upon and claims the benefit of priority under 35 U.S.C. §120 for U.S. Ser. No. 12/987,246, filed Jan. 10, 2011, and contains subject matter related to U.S. Utility application Ser. No. 12/268,842, filed on Nov. 11, 2008, the entire contents of each are hereby incorporated herein by reference.

BACKGROUND

Field

This technology generally is related to video decompression and compression systems, methods and computer program product and in particular to an integer transform function performed in those systems, methods and computer program product.

Description of the Related Art

The "background" description provided herein is for the purpose of generally presenting the context of the disclosure. Insight provided by the present inventor, to the extent it is described in this background section, as well as aspects of the description which may not otherwise qualify as prior art at the time of filing, are neither expressly or impliedly admitted as prior art.

Transmission of moving pictures in real-time is employed in numerous applications such as video conferencing, "net meetings", television (TV) broadcasting and video telephony. However, representing moving pictures involves bulk information, in digital form, and is described by representing each picture element (pixel) in a picture (or image frame) with 8 bits (1 Byte). Aggregation of uncompressed video data results in very large bit quantities, and as a consequence demands large bandwidth allocation for transmission over conventional communication networks in real time due to limited bandwidth.

Due to significant redundancy in images between successive frames, data compression is freely applied in real time video transmission applications. Data compression may, however, compromise picture quality and so persistent efforts continue to be made to develop data compression techniques allowing real time transmission of high quality video over bandwidth limited resources.

In video compression systems, an objective is to represent the video information with as little "capacity" as possible, where capacity is usually measured in bits, either as a constant value or as bits/time unit. By minimizing bits, the amount of bits that need to be transmitted is reduced, and therefore, the amount of communication resources needed to support the real time transmission of video data is also reduced.

The most common video coding methods are described in the MPEG* (e.g., MPEG 2 and MPEG 3) and H.26* (e.g., H.263 and H.264) standards. According to these standards, the video data is exposed to four main processes before transmission, namely prediction, transformation, quantization and entropy coding.

The prediction process performed in a prediction processor significantly reduces the number of bits required for each frame in a video sequence to be transferred. It takes advantage of the similarity of parts of the sequence with other parts of the sequence. A decoder that decodes the bit stream has side information to assist in the decoding process. This side information is known to both encoder and decoder and so only the difference has to be transferred. This difference typically requires much less capacity for its representation than the full image. The motion estimation aspect of the prediction is mainly based on picture content from previously reconstructed pictures where the location of the content is defined by motion vectors. The prediction process is typically performed on square block sizes (e.g. 16×16 pixels), although the size of the blocks may vary.

Note that in some cases, predictions of pixels based on the adjacent pixels in the same picture rather than pixels of preceding pictures are used. This is referred to as intra prediction, as opposed to inter prediction.

The transform and quantization processes will now be discussed in more detail. The residual represented as a block of data (e.g. 4×4 or 8×8 pixels) may still contain internal correlation. A conventional method of taking advantage of this is to perform a two dimensional block transform. The ITU recommendation H.264 uses a 4×4 or 8×8 integer type transform. This transforms n×n pixels into n×n transform coefficients and they can usually be represented by fewer bits than the raw pixel representation. Transformation of an n×n array of pixels with internal correlation will often result in an n×n block of transform coefficients with much fewer non-zero values than the original n×n pixel block.

Direct representation of the transform coefficients is still too costly for many applications. A quantization process is carried out for a further reduction of the data representation. Hence the transform coefficients output from the transform undergo quantization. The possible value range of the transform coefficients is divided into value intervals (or gradations), each limited by an uppermost and lowermost decision value and assigned a fixed quantization value. The transform coefficients are then quantified to the quantization value associated with the intervals within which the respective coefficients reside. Coefficients being lower than the lowest decision value are quantified to zeros. It should be mentioned that this quantization process results in the reconstructed video sequence being somewhat different compared to the uncompressed sequence.

Summarized, a digital video picture is exposed to the following steps:

Divide the picture into square blocks of pixels, for instance 16×16 or 8×8 pixels. This is done for luminance information as well as for chrominance information.

Produce a prediction for the pixels in the block. This may be based on pixels in an already coded/decoded picture (called inter prediction) or on already coded/decoded pixels in the same picture (intra prediction).

Form a difference between the pixels to be coded and the predicted pixels. This is often referred to as a residual.

Perform a two dimensional transformation of the residual resulting in a representation as transform coefficients.

Perform a quantization of the transform coefficients. This is the major tool for controlling the bit production and reconstructed picture quality.

Establish a scanning of the two dimensional transform coefficient data into a one dimensional set of data.

Perform lossless entropy coding of the quantized transform coefficients.

The above steps are listed in a natural order for the encoder. The decoder will to some extent perform the operations in the opposite order and do "inverse" operations as inverse transform instead of transform and de-quantization instead of quantization.

SUMMARY

The following paragraphs have been provided by way of general introduction, and are not intended to limit the scope of the appended claims. The described embodiments, together with further advantages, will be best understood by reference to the following detailed description taken in conjunction with the accompanying drawings.

The present inventor recognized limitations with conventional transform devices and methods in that they do not employ matrices that strike a desirable balance between vector length (and corresponding block size), transform element size, vector norms below a predetermined threshold, and inner products being less than a predetermined threshold.

In addressing these and other limitations, one aspect of the present disclosure provides a method (and device and computer program product) of video coding for transforming a first block of residual pixel values of a moving picture by a transform matrix formed by a number of basis vectors generating a corresponding second block of transform coefficients. The transform matrix may be derived from a discrete cosine transform (DCT) or Karhunen-Loeve transform (KLT). The basis vectors are close to, but need not be exactly orthogonal. The norms of the basis vectors have a deviation less than 0.0015 (or 0.15%), and the elements of the basis vectors are representable by 1 byte (elements in an inclusive range of −128 through 127).

Other aspects include a corresponding inverse method, device and computer program product, as well as video equipment, such as a video teleconferencing endpoint, that hosts the transform.

BRIEF DESCRIPTION OF THE DRAWINGS

These and other features, aspects and advantages of the present invention will become better understood with regard to the following description, appended claims and accompanying drawings where:

DETAILED DESCRIPTION

Figure 1:
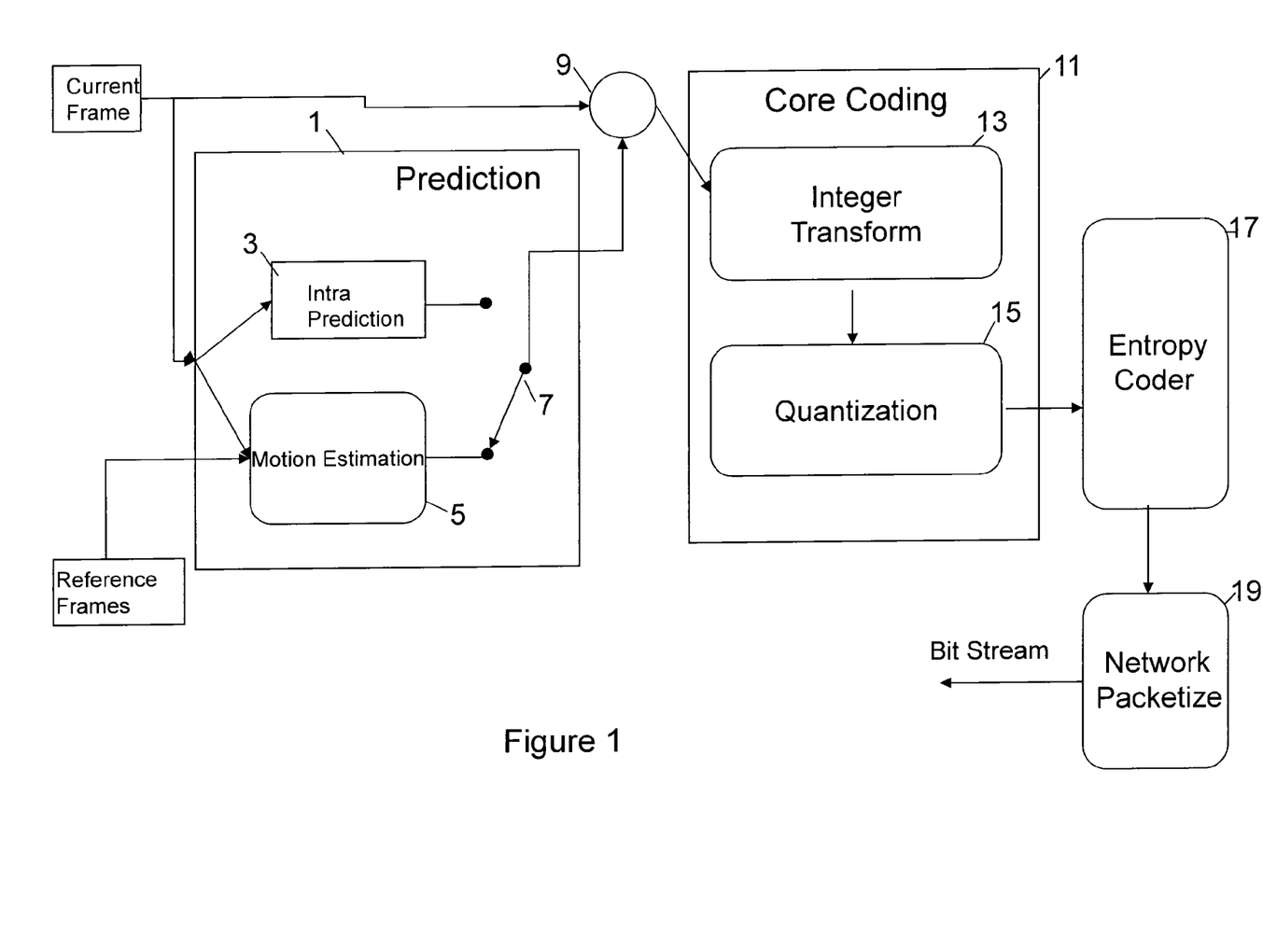
FIG. 1 is a block diagram showing a process flow in a video encoder that includes a transform operation according to the present disclosure.

In FIG. 1, a current frame as well as one or more reference frames are input to a prediction processor 1. The prediction processor 1 includes an intra prediction processing path 3 and a motion estimation processing path 5, the selection of which is controlled by switch 7. Intra prediction processing is selected for finding similarities within the current image frame, and is thus referred to as "intra" prediction. Motion estimation has a temporal component and thus involves analysis between successive frames is referred to as "inter" prediction.

The output of the switch 7 is combined with the pixels of the current frame in a combiner 9, prior to being subjected to core coding 11, which includes a transform processor 13 (often involving rate distortion control). Typically the transform is a discrete cosine transform (DCT), which is generally considered to a very good transform to be used in image and video compression. The DCT is defined with real numbers. For practical implementations there are good reasons to use a transform with integer numbers instead, as will be discussed later. The transformed data is then subjected to quantization in a quantizer 15 and then subject to an entropy encoder 17. Entropy encoding removes redundancies without losing information, and is referred to as a lossless encoding process. Subsequently, the encoded data is arranged in network packets via a packetizer 19, prior to be transmitted in a bit stream. The transform matrices described herein are employed in the transform processor 13. Likewise, an inverse quantization and transform is performed at a decoder to recover the image.

Figure 2:
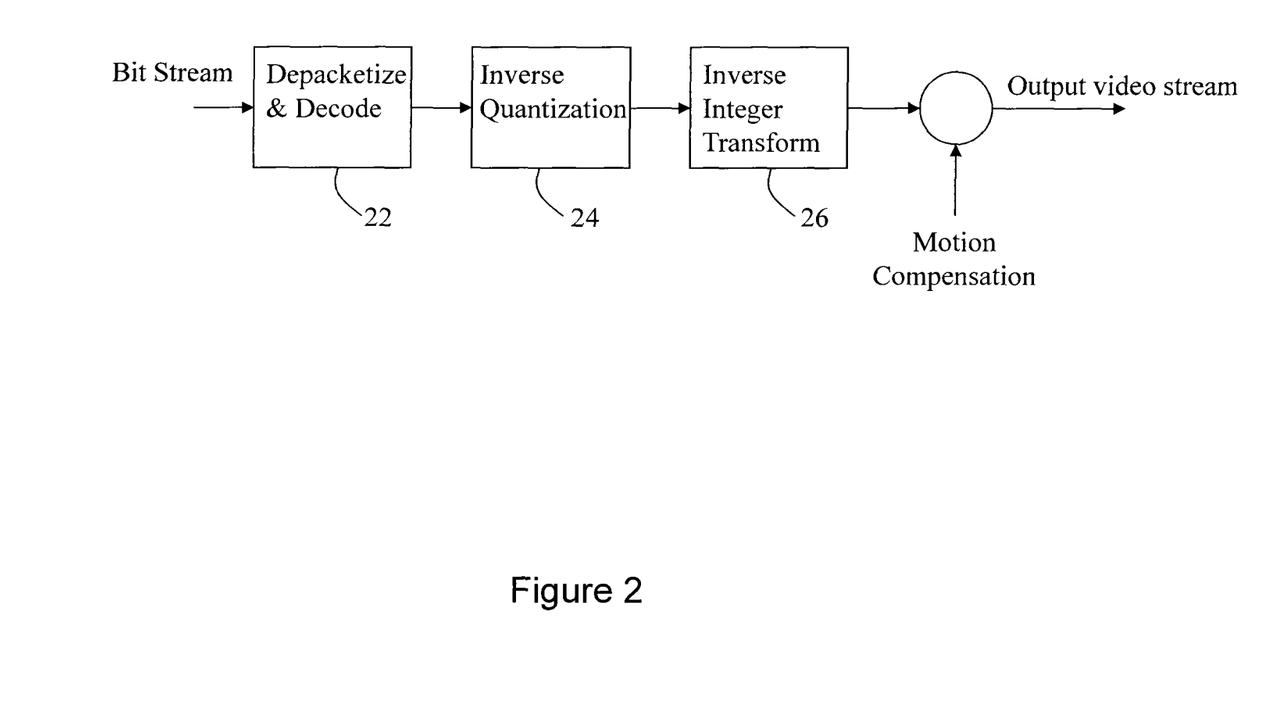
FIG. 2 is a block diagram showing a process flow in a video decoder that includes an inverse transform operation according to the present disclosure.

FIG. 2 is a block diagram showing a process flow within a decoder device according to an embodiment. An input bit stream from an encoder is applied to a depacketizer and decoder 22, which unpackages the data before sending the data to an inverse quantizer 24. The inverse quantizer 24 provides a best-effort at providing an inverse of the quantization performed in the quantization 15 (FIG. 1). The output of the inverse quantization 24 is applied to an inverse integer transform 26, which performs an inverse to the integer transform performed in the video encoder (FIG. 1). The integer transform 26 uses the same vectors as in the transform matrix to arrive at the original residue data, which was orignally applied to the transform maxtrix in the encoder. The residue data is then subjected to a reconstruction operation using motion compensation input to produce an output video stream.

Most conventional video standards produce block-based residuals that undergo a two dimensional transform on the encoding side and a corresponding inverse transform on the decoding side, and separable transforms are usually used. This means that a one dimensional transform is first performed in one direction (e.g. horizontal) followed by the same one dimensional transform being used on the result in the other direction (e.g., vertical). Hence only one dimensional transforms have to be defined and used.

In the standards H.261, H.263, and the corresponding MPEG standards, a 8 point DCT is used. According to signal theory, the DCT is close to an optimal transform if the correlation between neighbouring pixels in the residual signal is relatively high. The DCT is defined as 8 real valued basis vectors as listed below with 3 digit accuracy:

| 0.354 | 0.354 | 0.354 | 0.354 | 0.354 | 0.354 | 0.354 | 0.354 |
| 0.490 | 0.416 | 0.278 | 0.098 | −0.098 | −0.278 | −0.416 | −0.490 |
| 0.462 | 0.191 | −0.191 | −0.462 | −0.462 | −0.191 | 0.191 | 0.462 |
| 0.416 | −0.098 | −0.490 | −0.278 | 0.278 | 0.490 | 0.098 | −0.416 |
| 0.354 | −0.354 | −0.354 | 0.354 | 0.354 | −0.354 | −0.354 | 0.354 |
| 0.278 | −0.490 | 0.098 | 0.416 | −0.416 | −0.098 | 0.490 | −0.278 |
| 0.191 | −0.462 | 0.462 | −0.191 | −0.191 | 0.462 | −0.462 | 0.191 |
| 0.098 | −0.278 | 0.416 | −0.490 | 0.490 | −0.416 | 0.278 | −0.098 |

These basis vectors are said to be orthonormal, which means that (1) each vector (e.g., row) is orthogonal to all the other vectors, and (2) the norm, or square sum along each line, is equal to 1.

Defining now the above matrix of data T(i,j), i,j=0-7. i indicates the column number and j indicates row number. Assuming further that there is a set of 8 pixel values f(i) of an 8×8 block to be transformed into 8 transform values F(j). The following relations then apply:

$$F(j) = \sum_{i=0,7} f(i) * T(i, j), j = 0 - 7$$

Inverse transform or reconstruction of the pixels:

$$f(i) = \sum_{j=0,7} F(j) * T(i, j), i = 0 - 7$$

The transform is then normally preformed on each set of 8 pixel values of the 8×8 block, and then the whole procedure is repeated on the result vertically with the same transform matrix.

This transform performs well in theory. However in practice, as recognized by the present inventor, it has a disadvantage that it is based on real number representation. In implementation this will inevitably result in some inaccuracy, which in turn will be slightly different for different implementations using different internal representations of real numbers. This may lead to a mismatch between different reconstruction procedures. The implementation is also relatively complex. For these reasons it is desirable to use transforms that are described by integer numbers only.

The orthonormal conditions defined above are still desirable. With integer numbers it is impossible to obtain the condition that the square sum along each line is equal to 1. It is therefore more realistic and feasible to change the requirement of the norm to be the same for all vectors, but still maintaining the first requirement that each vector shall be orthogonal to all the other vectors.

An example of basis vectors satisfying the last-mentioned requirements are the Walsh Hadamard vectors. 8 point Hadamard vectors are as follows:

```
 1  1  1  1  1  1  1  1
 1  1  1  1 -1 -1 -1 -1
 1  1 -1 -1 -1 -1  1  1
 1  1 -1 -1  1  1 -1 -1
 1 -1 -1  1  1 -1 -1  1
 1 -1 -1  1 -1  1  1 -1
 1 -1  1 -1 -1  1 -1  1
 1 -1  1 -1  1 -1  1 -1
```

However, this transform turns out to have other drawbacks and is therefore not very much used.

A better and expanded set of requirements for integer transforms is found via the application of the following criteria:
1. The vectors shall be orthogonal.
2. The numbers used to define the vectors are small— typically less than 32, although as will be discussed, but also within a range representable in 1 Byte.
3. The shape of the vectors are as close as possible to the corresponding DCT.
4. The norm, or square sum along each line shall be the same for all vectors.

It is difficult to satisfy all the requirements—especially for larger transforms. The above requirements can therefore be considered to be listed in prioritized order. Traditionally, 1 and 2 have been considered to be mandatory, 3 may be only partly fulfilled whereas 4 may be worked around with some added complexity in the implementations.

In the early development of H.264 the following transform was considered, but not adopted:

```
13   13   13   13
17    7   -7  -17
13  -13  -13   13
 7  -17   17   -7
```

This vector set satisfied requirements 1, 2, 3, 4 above. H.264 and MPEG AVC standards use both 4 point and 8 point integer transforms. As for the 4 point transform, the basis vectors are:

```
1   1   1   1
2   1  -1  -2
1  -1  -1   1
1  -2   2  -1
```

Although this matrix was adopted in H.264, the vectors do not have the same norm, or close to the same norm. As a consequence, more numeric manipulation is required during quantization to avoid bias.

This vector set fulfils requirements 1, 2 and partly 3 above. As for the 8 point transform, the basis vectors are:

```
 1    1    1    1    1    1    1    1
12   10    6    3   -3   -6  -10  -12
 2    1   -1   -2   -2   -1    1    2
10   -3  -12   -6    6   12    3  -10
 1   -1   -1    1    1   -1   -1    1
 6  -12    3   10  -10   -3   12   -6
 1   -2    2   -1   -1    2   -2    1
 3   -6   10  -12   12  -10    6   -3
```

This vector set also satisfies requirements 1, 2 and partly 3. However, three different norms are present, with fairly large differences in value. Inventor experience has shown that it is still possible to reduce the requirements even further to improve coding efficiency and reduce the complexity without compromising with picture quality. The requirements for the transform are modified from above:
1. The vectors may not be exactly orthogonal, but very close.
2. The numbers used to define the vectors are small—say <32, or even 127, so as to be represented in one Byte.

3. The shape of the vectors are as close as possible to the optimal transform. Depending on the statistics of the signal to be coded, this may be DCT or a Karhunen-Loeve (KLT) transform based on the statistics of the signal.
4. The norm of the vectors may not be exactly the same, but very close.

The present inventor realized that the relaxations on 1 and 4 may be small enough so that the encoding/decoding performance is practically the same as if 1 and 4 were completely fulfilled.

The present embodiment employs a design of transform vector sets with slightly relaxed requirements 1 and 4 resulting in better coding performance mainly due to better fulfilment of requirement 3. The basis vectors have a shape close to a corresponding DCT or KLT, and at the same time norms that are similar but not necessarily exactly equal with a maximum deviation less than 0.01, or better 0.0015 relative to the DC vector (the vector with all elements have a common sign).

As a measure for the deviation from the DCT, it should be understood that for an N-point DCT the basis vectors V(i,j) may be written as:

Transform coefficient j: $V(i,j)=K_j * \cos(\pi/2N*(j-1)*(2i-1)), i,j=1$ to $N$.

$K_j$ is a normalization constant for the transform coefficient j.

The comparison is to be made between the vector sets U(i,j) and V(i,j). It is assumed that $K_j$ is chosen so that the norm of the vector set V(i,j) is the same as for the vector set U(i,j).

A measure for the difference between vector elements in the two transforms is an "element deviation":

$D(i,j)=|V(i,j)-U(i,j)|/\sqrt{Norm(j)/N}$.

It is then possible to specify a set of vectors that have a shape that is close to the shape of the DCT vectors if all values D(i,j) for a set of vectors have an element deviation smaller than or equal to 0.05, for example.

In addition, the basis vectors are close to orthogonal but not exactly orthogonal, and the numbers used to specify the set of transform vectors are small, and in a range of −128 to 127, so as to be represented in one byte.

A first step for approaching a set of transform vectors according to the present invention is to make an integer version of the DCT vectors by multiplying the DCT vectors by $26*\sqrt{2}$, a scaling factor, and rounding to the nearest integer. The result would be as follows, with the square sum to the right of each row:

| 13 | 13 | 13 | 13 | 13 | 13 | 13 | 13 | 1352 |
| 18 | 15 | 10 | 4 | −4 | −10 | −15 | −18 | 1330 |
| 17 | 7 | −7 | −17 | −17 | −7 | 7 | 17 | 1352 |
| 15 | −4 | −18 | −10 | 10 | 18 | 4 | −15 | 1330 |
| 13 | −13 | −13 | 13 | 13 | −13 | −13 | 13 | 1352 |
| 10 | −18 | 4 | 15 | −15 | −4 | 18 | −10 | 1330 |
| 7 | −17 | 17 | −7 | −7 | 17 | −17 | 7 | 1352 |
| 4 | −10 | 15 | −18 | 18 | −15 | 10 | −4 | 1330 |

The square sum indicates that the norm is not identical for all vectors, nor is it within the 0.0015 threshold. However, as a second step for approaching a set of transform vectors according to the present embodiment, a slight modification of the numbers can make the norm of each vector much closer to each other, and close enough to be considered to have equal norm. An approximate orthogonality between vectors, close enough to be considered as orthogonal can also be obtained, in addition to a shape of the vectors very close to the DCT can also be obtained by a slight modification of the numbers.

The inventor has obtained the following set of vectors as an example of an appropriate transform according to the present embodiment (the number on the right side of each row is the square sum of the respective vector):

| 13 | 13 | 13 | 13 | 13 | 13 | 13 | 13 | 1352 |
| 17 | 16 | 11 | 3 | −3 | −11 | −16 | −17 | 1350 |
| 17 | 7 | −7 | −17 | −17 | −7 | 7 | 17 | 1352 |
| 16 | −3 | −17 | −11 | 11 | 17 | 3 | −16 | 1350 |
| 13 | −13 | −13 | 13 | 13 | −13 | −13 | 13 | 1352 |
| 11 | −17 | 3 | 16 | −16 | −3 | 17 | −11 | 1350 |
| 7 | −17 | 17 | −7 | −7 | 17 | −17 | 7 | 1352 |
| 3 | −11 | 16 | −17 | 17 | −16 | 11 | −3 | 1350 |

In the decoding process, to obtain residual pixels from transform coefficients, the inverse set of vectors are used, i.e. the transpose of the set of vectors above is used. The decoder may be implemented in a programmed processor, firmware circuit or dedicated circuit device, for example.

As further refinement, alternative transform matrixes are presented that comply with the criteria described below. Because the transform uses integer elements, the transform cannot be identical to the DCT. For the description below, it will be referred to as DCT', indicating that it is an approximation to the real DCT due to the integer constraint. An N-point DCT' transformation may be defined by a set of N basis vectors $U(i,j)=\{x1j, x2j, x3j, \ldots xNj\}, j=1 \ldots N$. In one and only one of the vectors, all the elements $x_{i,j}$ have the same sign. This vector is called the DC vector. The norm of a vector is defined as Norm(j)=sum_i=1,N(xij*xij). Then the inner product of two vectors is defined as Inner(j0,j1)= sum_i=1,N(xij0* xij1). If Inner(j0,j1)=0 the vectors j0 and j1 are defined to be orthogonal. Consistent with this nomenclature, a transform consistent with the principles of the present embodiment will comply with the following requirements:

1. All elements xij shall be integer numbers.
2. All elements xij shall be in the range <−128 to 127>, so as to fit into 1 Byte.
3. None of the vectors shall have a norm that differs more than 0.0015 from the norm of the DC vector.
4. For all j0,j1 where j0 is different from j1, |Inner(j0,j1)| shall be less that 0.003.
5. The vectors shall have a shape that is close to the shape of the DCT vectors, such as a maximum element deviation for any vector element is not greater than 0.05.

The following is an example of a 4×4 matrix that complies with the above requirements. Each vector is contained within a pair of brackets. The transform matrix may be applied in an encoding context or decoding context, recognizing that the vector basis sets are the same and so the follow matrix may also be recognized as an inverse transform matrix used in a decoding setting.
{64, 64, 64, 64,}
{83, 36, −36, −83,}
{64, −64, −64, 64,}
{36, −83, 83, −36,}

The following is an example of a 8×8 matrix that complies with the above requirements. Each vector is contained within a pair of brackets. The transform matrix may be applied in an encoding context or decoding context, recognizing that the vector basis sets are the same and so the follow matrix may also be recognized as an inverse transform matrix used in a decoding setting.
{64, 64, 64, 64, 64, 64, 64, 64,}
{89, 75, 50, 18, −18, −50, −75, −89,}
{83, 36, −36, −83, −83, −36, 36, 83,}
{75, −18, −89, −50, 50, 89, 18, −75,}
{64, −64, −64, 64, 64, −64, −64, 64,}
{50, −89, 18, 75, −75, −18, 89, −50,}
{36, −83, 83, −36, −36, 83, −83, 36,}
{18, −50, 75, −89, 89, −75, 50, −18,}

The following is an example of a 16×16 matrix that complies with the above requirements. Each vector is contained within a pair of brackets. The transform matrix may be applied in an encoding context or decoding context, recognizing that the vector basis sets are the same and so the follow matrix may also be recognized as an inverse transform matrix used in a decoding setting.
{64, 64, 64, 64, 64, 64, 64, 64, 64, 64, 64, 64, 64, 64, 64, 64,}
{90, 87, 80, 70, 57, 43, 25, 9, −9, −25, −43, −57, −70, −80, −87, −90,}
{89, 75, 50, 18, −18, −50, −75, −89, −89, −75, −50, −18, 18, 50, 75, 89,}
{87, 57, 9, −43, −80, −90, −70, −25, 25, 70, 90, 80, 43, −9, −57, −87,}
{83, 36, −36, −83, −83, −36, 36, 83, 83, 36, −36, −83, −83, −36, 36, 83,}
{80, 9, −70, −87, −25, 57, 90, 43, −43, −90, −57, 25, 87, 70, −9, −80,}
{75, −18, −89, −50, 50, 89, 18, −75, −75, 18, 89, 50, −50, −89, −18, 75,}
{70, −43, −87, 9, 90, 25, −80, −57, 57, 80, −25, −90, −9, 87, 43, −70,}
{64, −64, −64, 64, 64, −64, −64, 64, 64, −64, −64, 64, 64, −64, −64, 64,}
{57, −80, −25, 90, −9, −87, 43, 70, −70, −43, 87, 9, −90, 25, 80, −57,}
{50, −89, 18, 75, −75, −18, 89, −50, −50, 89, −18, −75, 75, 18, −89, 50,}
{43, −90, 57, 25, −87, 70, 9, −80, 80, −9, −70, 87, −25, −57, 90, −43,}
{36, −83, 83, −36, −36, 83, −83, 36, 36, −83, 83, −36, −36, 83, −83, 36,}
{25, −70, 90, −80, 43, 9, −57, 87, −87, 57, −9, −43, 80, −90, 70, −25,}
{18, −50, 75, −89, 89, −75, 50, −18, −18, 50, −75, 89, −89, 75, −50, 18,}
{9, −25, 43, −57, 70, −80, 87, −90, 90, −87, 80, −70, 57, −43, 25, −9,}

The following is an example of a 32×32 matrix that complies with the above requirements. Each vector is contained within a pair of brackets. The transform matrix may be applied in an encoding context or decoding context, recognizing that the vector basis sets are the same and so the follow matrix may also be recognized as an inverse transform matrix used in a decoding setting.

{64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64,}
{90, 90, 88, 85, 82, 78, 73, 67, 61, 54, 46, 38, 31, 22, 13, 4, −4, −13, −22, −31, −38, −46, −54, −61, −67, −73, −78, −82, −85, −88, −90, −90,}
{90, 87, 80, 70, 57, 43, 25, 9, −9, −25, −43, −57, −70, −80, −87, −90, −90, −87, −80, −70, −57, −43, −25, −9, 9, 25, 43, 57, 70, 80, 87, 90,}
{90, 82, 67, 46, 22, −4, −31, −54, −73, −85, −90, −88, −78, −61, −38, −13, 13, 38, 61, 78, 88, 90, 85, 73, 54, 31, 4, −22, −46, −67, −82, −90,}
{89, 75, 50, 18, −18, −50, −75, −89, −89, −75, −50, −18, 18, 50, 75, 89, 89, 75, 50, 18, −18, −50, −75, −89, −89, −75, −50, −18, 18, 50, 75, 89,}
{88, 67, 31, −13, −54, −82, −90, −78, −46, −4, 38, 73, 90, 85, 61, 22, −22, −61, −85, −90, −73, −38, 4, 46, 78, 90, 82, 54, 13, −31, −67, −88,}
{87, 57, 9, −43, −80, −90, −70, −25, 25, 70, 90, 80, 43, −9, −57, −87, −87, −57, −9, 43, 80, 90, 70, 25, −25, −70, −90, −80, −43, 9, 57, 87,}
{85, 46, −13, −67, −90, −73, −22, 38, 82, 88, 54, −4, −61, −90, −78, −31, 31, 78, 90, 61, 4, −54, −88, −82, −38, 22, 73, 90, 67, 13, −46, −85,}
{83, 36, −36, −83, −83, −36, 36, 83, 83, 36, −36, −83, −83, −36, 36, 83, 83, 36, −36, −83, −83, −36, 36, 83, 83, 36, −36, −83, −83, −36, 36, 83,}
{82, 22, −54, −90, −61, 13, 78, 85, 31, −46, −90, −67, 4, 73, 88, 38, −38, −88, −73, −4, 67, 90, 46, −31, −85, −78, −13, 61, 90, 54, −22, −82,}
{80, 9, −70, −87, −25, 57, 90, 43, −43, −90, −57, 25, 87, 70, −9, −80, −80, −9, 70, 87, 25, −57, −90, −43, 43, 90, 57, −25, −87, −70, 9, 80,}
{78, −4, −82, −73, 13, 85, 67, −22, −88, −61, 31, 90, 54, −38, −90, −46, 46, 90, 38, −54, −90, −31, 61, 88, 22, −67, −85, −13, 73, 82, 4, −78,}
{75, −18, −89, −50, 50, 89, 18, −75, −75, 18, 89, 50, −50, −89, −18, 75, 75, −18, −89, −50, 50, 89, 18, −75, −75, 18, 89, 50, −50, −89, −18, 75,}
{73, −31, −90, −22, 78, 67, −38, −90, −13, 82, 61, −46, −88, −4, 85, 54, −54, −85, 4, 88, 46, −61, −82, 13, 90, 38, −67, −78, 22, 90, 31, −73,}
{70, −43, −87, 9, 90, 25, −80, −57, 57, 80, −25, −90, −9, 87, 43, −70, −70, 43, 87, −9, −90, −25, 80, 57, −57, −80, 25, 90, 9, −87, −43, 70,}
{67, −54, −78, 38, 85, −22, −90, 4, 90, 13, −88, −31, 82, 46, −73, −61, 61, 73, −46, −82, 31, 88, −13, −90, −4, 90, 22, −85, −38, 78, 54, −67,}
{64, −64, −64, 64, 64, −64, −64, 64, 64, −64, −64, 64, 64, −64, −64, 64, 64, −64, −64, 64, 64, −64, −64, 64, 64, −64, −64, 64, 64, −64, −64, 64,}
{61, −73, −46, 82, 31, −88, −13, 90, −4, −90, 22, 85, −38, −78, 54, 67, −67, −54, 78, 38, −85, −22, 90, 4, −90, 13, 88, −31, −82, 46, 73, −61,}
{57, −80, −25, 90, −9, −87, 43, 70, −70, −43, 87, 9, −90, 25, 80, −57, −57, 80, 25, −90, 9, 87, −43, −70, 70, 43, −87, −9, 90, −25, −80, 57,}
{54, −85, −4, 88, −46, −61, 82, 13, −90, 38, 67, −78, −22, 90, −31, −73, 73, 31, −90, 22, 78, −67, −38, 90, −13, −82, 61, 46, −88, 4, 85, −54,}
{50, −89, 18, 75, −75, −18, 89, −50, −50, 89, −18, −75, 75, 18, −89, 50, 50, −89, 18, 75, −75, −18, 89, −50, −50, 89, −18, −75, 75, 18, −89, 50,}
{46, −90, 38, 54, −90, 31, 61, −88, 22, 67, −85, 13, 73, −82, 4, 78, −78, −4, 82, −73, −13, 85, −67, −22, 88, −61, −31, 90, −54, −38, 90, −46,}

{43, −90, 57, 25, −87, 70, 9, −80, 80, −9, −70, 87, −25, −57, 90, −43, −43, 90, −57, −25, 87, −70, −9, 80, −80, 9, 70, −87, 25, 57, −90, 43,}
{38, −88, 73, −4, −67, 90, −46, −31, 85, −78, 13, 61, −90, 54, 22, −82, 82, −22, −54, 90, −61, −13, 78, −85, 31, 46, −90, 67, 4, −73, 88, −38,}
{36, −83, 83, −36, −36, 83, −83, 36, 36, −83, 83, −36, −36, 83, −83, 36, 36, −83, 83, −36, −36, 83, −83, 36, 36, −83, 83, −36, −36, 83, −83, 36,}
{31, −78, 90, −61, 4, 54, −88, 82, −38, −22, 73, −90, 67, −13, −46, 85, −85, 46, 13, −67, 90, −73, 22, 38, −82, 88, −54, −4, 61, −90, 78, −31,}
{25, −70, 90, −80, 43, 9, −57, 87, −87, 57, −9, −43, 80, −90, 70, −25, −25, 70, −90, 80, −43, −9, 57, −87, 87, −57, 9, 43, −80, 90, −70, 25,}
{22, −61, 85, −90, 73, −38, −4, 46, −78, 90, −82, 54, −13, −31, 67, −88, 88, −67, 31, 13, −54, 82, −90, 78, −46, 4, 38, −73, 90, −85, 61, −22,}
{18, −50, 75, −89, 89, −75, 50, −18, −18, 50, −75, 89, −89, 75, −50, 18, 18, −50, 75, −89, 89, −75, 50, −18, −18, 50, −75, 89, −89, 75, −50, 18,}
{13, −38, 61, −78, 88, −90, 85, −73, 54, −31, 4, 22, −46, 67, −82, 90, −90, 82, −67, 46, −22, −4, 31, −54, 73, −85, 90, −88, 78, −61, 38, −13,}
{9, −25, 43, −57, 70, −80, 87, −90, 90, −87, 80, −70, 57, −43, 25, −9, −9, 25, −43, 57, −70, 80, −87, 90, −90, 87, −80, 70, −57, 43, −25, 9,}
{4, −13, 22, −31, 38, −46, 54, −61, 67, −73, 78, −82, 85, −88, 90, −90, 90, −90, 88, −85, 82, −78, 73, −67, 61, −54, 46, −38, 31, −22, 13, −4,}

The following is an example of a 64×64 matrix that complies with the above requirements. Each vector is contained within a pair of brackets. The transform matrix may be applied in an encoding context or decoding context, recognizing that the vector basis sets are the same and so the follow matrix may also be recognized as an inverse transform matrix used in a decoding setting.

{64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64,}
{91, 90, 90, 89, 88, 87, 86, 84, 83, 81, 79, 76, 74, 71, 69, 66, 62, 59, 56, 52, 48, 45, 41, 37, 33, 28, 24, 20, 16, 11, 7, 2, −2, −7, −11, −16, −20, −24, −28, −33, −37, −41, −45, −48, −52, −56, −59, −62, −66, −69, −71, −74, −76, −79, −81, −83, −84, −86, −87, −88, −89, −90, −90, −91,}
{90, 90, 88, 85, 82, 78, 73, 67, 61, 54, 46, 38, 31, 22, 13, 4, −4, −13, −22, −31, −38, −46, −54, −61, −67, −73, −78, −82, −85, −88, −90, −90, −90, −90, −88, −85, −82, −78, −73, −67, −61, −54, −46, −38, −31, −22, −13, −4, 4, 13, 22, 31, 38, 46, 54, 61, 67, 73, 78, 82, 85, 88, 90, 90,}
{90, 88, 84, 79, 71, 62, 52, 41, 28, 16, 2, −11, −24, −37, −48, −59, −69, −76, −83, −87, −90, −91, −89, −86, −81, −74, −66, −56, −45, −33, −20, −7, 7, 20, 33, 45, 56, 66, 74, 81, 86, 89, 91, 90, 87, 83, 76, 69, 59, 48, 37, 24, 11, −2, −16, −28, −41, −52, −62, −71, −79, −84, −88, −90,}
{90, 87, 80, 70, 57, 43, 25, 9, −9, −25, −43, −57, −70, −80, −87, −90, −90, −87, −80, −70, −57, −43, −25, −9, 9, 25, 43, 57, 70, 80, 87, 90, 90, 87, 80, 70, 57, 43, 25, 9, −9, −25, −43, −57, −70, −80, −87, −90, −90, −87, −80, −70, −57, −43, −25, −9, 9, 25, 43, 57, 70, 80, 87, 90,}
{90, 84, 74, 59, 41, 20, −2, −24, −45, −62, −76, −86, −90, −89, −83, −71, −56, −37, −16, 7, 28, 48, 66, 79, 87, 91, 88, 81, 69, 52, 33, 11, −11, −33, −52, −69, −81, −88, −91, −87, −79, −66, −48, −28, −7, 16, 37, 56, 71, 83, 89, 90, 86, 76, 62, 45, 24, 2, −20, −41, −59, −74, −84, −90,}
{90, 82, 67, 46, 22, −4, −31, −54, −73, −85, −90, −88, −78, −61, −38, −13, 13, 38, 61, 78, 88, 90, 85, 73, 54, 31, 4, −22, −46, −67, −82, −90, −90, −82, −67, −46, −22, 4, 31, 54, 73, 85, 90, 88, 78, 61, 38, 13, −13, −38, −61, −78, −88, −90, −85, −73, −54, −31, −4, 22, 46, 67, 82, 90,}
{89, 79, 59, 33, 2, −28, −56, −76, −88, −90, −81, −62, −37, −7, 24, 52, 74, 87, 90, 83, 66, 41, 11, −20, −48, −71, −86, −91, −84, −69, −45, −16, 16, 45, 69, 84, 91, 86, 71, 48, 20, −11, −41, −66, −83, −90, −87, −74, −52, −24, 7, 37, 62, 81, 90, 88, 76, 56, 28, −2, −33, −59, −79, −89,}
{89, 75, 50, 18, −18, −50, −75, −89, −89, −75, −50, −18, 18, 50, 75, 89, 89, 75, 50, 18, −18, −50, −75, −89, −89, −75, −50, −18, 18, 50, 75, 89, 89, 75, 50, 18, −18, −50, −75, −89, −89, −75, −50, −18, 18, 50, 75, 89, 89, 75, 50, 18, −18, −50, −75, −89, −89, −75, −50, −18, 18, 50, 75, 89,}
{88, 71, 41, 2, −37, −69, −87, −89, −74, −45, −7, 33, 66, 86, 90, 76, 48, 11, −28, −62, −84, −90, −79, −52, −16, 24, 59, 83, 91, 81, 56, 20, −20, −56, −81, −91, −83, −59, −24, 16, 52, 79, 90, 84, 62, 28, −11, −48, −76, −90, −86, −66, −33, 7, 45, 74, 89, 87, 69, 37, −2, −41, −71, −88,}
{88, 67, 31, −13, −54, −82, −90, −78, −46, −4, 38, 73, 90, 85, 61, 22, −22, −61, −85, −90, −73, −38, 4, 46, 78, 90, 82, 54, 13, −31, −67, −88, −88, −67, −31, 13, 54, 82, 90, 78, 46, 4, −38, −73, −90, −85, −61, −22, 22, 61, 85, 90, 73, 38, −4, −46, −78, −90, −82, −54, −13, 31, 67, 88,}
{87, 62, 20, −28, −69, −89, −84, −56, −11, 37, 74, 90, 81, 48, 2, −45, −79, −91, −76, −41, 7, 52, 83, 90, 71, 33, −16, −59, −86, −88, −66, −24, 24, 66, 88, 86, 59, 16, −33, −71, −90, −83, −52, −7, 41, 76, 91, 79, 45, −2, −48, −81, −90, −74, −37, 11, 56, 84, 89, 69, 28, −20, −62, −87,}
{87, 57, 9, −43, −80, −90, −70, −25, 25, 70, 90, 80, 43, −9, −57, −87, −87, −57, −9, 43, 80, 90, 70, 25, −25, −70, −90, −80, −43, 9, 57, 87, 87, 57, 9, −43, −80, −90, −70, −25, 25, 70, 90, 80, 43, −9, −57, −87, −87, −57, −9, 43, 80, 90, 70, 25, −25, −70, −90, −80, −43, 9, 57, 87,}
{86, 52, −2, −56, −87, −84, −48, 7, 59, 88, 83, 45, −11, −62, −89, −81, −41, 16, 66, 90, 79, 37, −20, −69, −90, −76, −33, 24, 71, 91, 74, 28, −28, −74, −91, −71, −24, 33, 76, 90, 69, 20, −37, −79, −90, −66, −16, 41, 81, 89, 62, 11, −45, −83, −88, −59, −7, 48, 84, 87, 56, 2, −52, −86,}
{85, 46, −13, −67, −90, −73, −22, 38, 82, 88, 54, −4, −61, −90, −78, −31, 31, 78, 90, 61, 4, −54, −88, −82, −38, 22, 73, 90, 67, 13, −46, −85, −85, −46, 13, 67, 90, 73, 22, −38, −82, −88, −54, 4, 61, 90, 78, 31, −31, −78, −90, −61, −4, 54, 88, 82, 38, −22, −73, −90, −67, −13, 46, 85,}
{84, 41, −24, −76, −89, −56, 7, 66, 91, 69, 11, −52, −88, −79, −28, 37, 83, 86, 45, −20, −74, −90, −59, 2, 62, 90, 71, 16, −48, −87, −81, −33, 33, 81, 87, 48, −16, −71, −90, −62, −2, 59, 90, 74, 20, −45, −86, −83, −37, 28, 79, 88, 52, −11, −69, −91, −66, −7, 56, 89, 76, 24, −41, −84,}
{83, 36, −36, −83, −83, −36, 36, 83, 83, 36, −36, −83, −83, −36, 36, 83, 83, 36, −36, −83, −83, −36, 36, 83, 83, 36, −36, −83, −83, −36, 36, 83, 83, 36, −36, −83, −83, −36, 36, 83, 83, 36, −36, −83, −83, −36, 36, 83, 83, 36, −36, −83, −83, −36, 36, 83, 83, 36, −36, −83, −83, −36, 36, 83,}
{83, 28, −45, −88, −74, −11, 59, 91, 62, −7, −71, −89, −48, 24, 81, 84, 33, −41, −87, −76, −16, 56, 90, 66, −2, −69, −90, −52, 20, 79, 86, 37, −37, −86, −79, −20, 52, 90, 69, 2, −66, −90, −56, 16, 76, 87, 41, −33, −84, −81, −24, 48, 89, 71, 7, −62, −91, −59, 11, 74, 88, 45, −28, −83,}
{82, 22, −54, −90, −61, 13, 78, 85, 31, −46, −90, −67, 4, 73, 88, 38, −38, −88, −73, −4, 67, 90, 46, −31, −85, −78, −13, 61, 90, 54, −22, −82, −82, −22, 54, 90, 61, −13, −78, −85, −31, 46, 90, 67, −4, −73, −88, −38, 38, 88, 73, 4, −67, −90, −46, 31, 85, 78, 13, −61, −90, −54, 22, 82,}
{81, 16, −62, −90, −45, 37, 88, 69, −7, −76, −84, −24, 56, 91, 52, −28, −86, −74, −2, 71, 87, 33, −48, −90, −59, 20, 83, 79, 11, −66, −89, −41, 41, 89, 66, −11, −79, −83, −20, 59, 90, 48, −33, −87, −71, 2, 74, 86, 28, −52, −91, −56, 24, 84, 76, 7, −69, −88, −37, 45, 90, 62, −16, −81,}
{80, 9, −70, −87, −25, 57, 90, 43, −43, −90, −57, 25, 87, 70, −9, −80, −80, −9, 70, 87, 25, −57, −90, −43, 43, 90, 57, −25, −87, −70, 9, 80, 80, 9, −70, −87, −25, 57, 90, 43, −43, −90, −57, 25, 87, 70, −9, −80, −80, −9, 70, 87, 25, −57, −90, −43, 43, 90, 57, −25, −87, −70, 9, 80,}
{79, 2, −76, −81, −7, 74, 83, 11, −71, −84, −16, 69, 86, 20, −66, −87, −24, 62, 88, 28, −59, −89, −33, 56, 90, 37, −52, −90, −41, 48, 91, 45, −45, −91, −48, 41, 90, 52, −37, −90, −56, 33, 89, 59, −28, −88, −62, 24, 87, 66, −20, −86, −69, 16, 84, 71, −11, −83, −74, 7, 81, 76, −2, −79,}
{78, −4, −82, −73, 13, 85, 67, −22, −88, −61, 31, 90, 54, −38, −90, −46, 46, 90, 38, −54, −90, −31, 61, 88, 22, −67, −85, −13, 73, 82, 4, −78, −78, 4, 82, 73, −13, −85, −67, 22, 88, 61, −31, −90, −54, 38, 90, 46, −46, −90, −38, 54, 90, 31, −61, −88, −22, 67, 85, 13, −73, −82, −4, 78,}
{76, −11, −86, −62, 33, 90, 45, −52, −89, −24, 69, 83, 2, −81, −71, 20, 88, 56, −41, −91, −37, 59, 87, 16, −74, −79, 7, 84, 66, −28, −90, −48, 48, 90, 28, −66, −84, −7, 79, 74, −16, −87, −59, 37, 91, 41, −56, −88, −20, 71, 81, −2, −83, −69, 24, 89, 52, −45, −90, −33, 62, 86, 11, −76,}
{75, −18, −89, −50, 50, 89, 18, −75, −75, 18, 89, 50, −50, −89, −18, 75, 75, −18, −89, −50, 50, 89, 18, −75, −75, 18, 89, 50, −50, −89, −18, 75, 75, −18, −89, −50, 50, 89, 18, −75, −75, 18, 89, 50, −50, −89, −18, 75, 75, −18, −89, −50, 50, 89, 18, −75, −75, 18, 89, 50, −50, −89, −18, 75,}
{74, −24, −90, −37, 66, 81, −11, −88, −48, 56, 86, 2, −84, −59, 45, 89, 16, −79, −69, 33, 91, 28, −71, −76, 20, 90, 41, −62, −83, 7, 87, 52, −52, −87, −7, 83, 62, −41, −90, −20, 76, 71, −28, −91, −33, 69, 79, −16, −89, −45, 59, 84, −2, −86, −56, 48, 88, 11, −81, −66, 37, 90, 24, −74,}
{73, −31, −90, −22, 78, 67, −38, −90, −13, 82, 61, −46, −88, −4, 85, 54, −54, −85, 4, 88, 46, −61, −82, 13, 90, 38, −67, −78, 22, 90, 31, −73, −73, 31, 90, 22, −78, −67, 38, 90, 13, −82, −61, 46, 88, 4, −85, −54, 54, 85, −4, −88, −46, 61, 82, −13, −90, −38, 67, 78, −22, −90, −31, 73,}
{71, −37, −89, −7, 86, 48, −62, −79, 24, 91, 20, −81, −59, 52, 84, −11, −90, −33, 74, 69, −41, −88, −2, 87, 45, −66, −76, 28, 90, 16, −83, −56, 56, 83, −16, −90, −28, 76, 66, −45, −87, 2, 88, 41, −69, −74, 33, 90, 11, −84, −52, 59, 81, −20, −91, −24, 79, 62, −48, −86, 7, 89, 37, −71,}
{70, −43, −87, 9, 90, 25, −80, −57, 57, 80, −25, −90, −9, 87, 43, −70, −70, 43, 87, −9, −90, −25, 80, 57, −57, −80, 25, 90, 9, −87, −43, 70, 70, −43, −87, 9, 90, 25, −80, −57, 57, 80, −25, −90, −9, 87, 43, −70, −70, 43, 87, −9, −90, −25, 80, 57, −57, −80, 25, 90, 9, −87, −43, 70,}
{69, −48, −83, 24, 90, 2, −89, −28, 81, 52, −66, −71, 45, 84, −20, −90, −7, 88, 33, −79, −56, 62, 74, −41, −86, 16, 91, 11, −87, −37, 76, 59, −59, −76, 37, 87, −11, −91, −16, 86, 41, −74, −62, 56, 79, −33, −88, 7, 90, 20, −84, −45, 71, 66, −52, −81, 28, 89, −2, −90, −24, 83, 48, −69,}
{67, −54, −78, 38, 85, −22, −90, 4, 90, 13, −88, −31, 82, 46, −73, −61, 61, 73, −46, −82, 31, 88, −13, −90, −4, 90, 22, −85, −38, 78, 54, −67, −67, 54, 78, −38, −85, 22, 90, −4, −90, −13, 88, 31, −82, −46, 73, 61, −61, −73, 46, 82, −31, −88, 13, 90, 4, −90, −22, 85, 38, −78, −54, 67,}
{66, −59, −71, 52, 76, −45, −81, 37, 84, −28, −87, 20, 89, −11, −90, 2, 91, 7, −90, −16, 88, 24, −86, −33, 83, 41, −79, −48, 74, 56, −69, −62, 62, 69, −56, −74, 48, 79, −41, −83, 33, 86, −24, −88, 16, 90, −7, −91, −2, 90, 11, −89, −20, 87, 28, −84, −37, 81, 45, −76, −52, 71, 59, −66,}
{64, −64, −64, 64, 64, −64, −64, 64, 64, −64, −64, 64, 64, −64, −64, 64, 64, −64, −64, 64, 64, −64, −64, 64, 64, −64, −64, 64, 64, −64, −64, 64, 64, −64, −64, 64, 64, −64, −64, 64, 64, −64, −64, 64, 64, −64, −64, 64, 64, −64, −64, 64, 64, −64, −64, 64, 64, −64, −64, 64, 64, −64, −64, 64,}
{62, −69, −56, 74, 48, −79, −41, 83, 33, −86, −24, 88, 16, −90, −7, 91, −2, −90, 11, 89, −20, −87, 28, 84, −37, −81, 45, 76, −52, −71, 59, 66, −66, −59, 71, 52, −76, −45, 81, 37, −84, −28, 87, 20, −89, −11, 90, 2, −91, 7, 90, −16, −88, 24, 86, −33, −83, 41, 79, −48, −74, 56, 69, −62,}
{61, −73, −46, 82, 31, −88, −13, 90, −4, −90, 22, 85, −38, −78, 54, 67, −67, −54, 78, 38, −85, −22, 90, 4, −90, 13, 88, −31, −82, 46, 73, −61, −61, 73, 46, −82, −31, 88, 13, −90, 4, 90, −22, −85, 38, 78, −54, −67, 67, 54, −78, −38, 85, 22, −90, −4, 90, −13, −88, 31, 82, −46, −73, 61,}
{59, −76, −37, 87, 11, −91, 16, 86, −41, −74, 62, 56, −79, −33, 88, 7, −90, 20, 84, −45, −71, 66, 52, −81, −28, 89, 2, −90, 24, 83, −48, −69, 69, 48, −83, −24, 90, −2, −89, 28, 81, −52, −66, 71, 45, −84, −20, 90, −7, −88, 33, 79, −56, −62, 74, 41, −86, −16, 91, −11, −87, 37, 76, −59,}
{57, −80, −25, 90, −9, −87, 43, 70, −70, −43, 87, 9, −90, 25, 80, −57, −57, 80, 25, −90, 9, 87, −43, −70, 70, 43, −87, −9, 90, −25, −80, 57, 57, −80, −25, 90, −9, −87, 43, 70, −70, −43, 87, 9, −90, 25, 80, −57, −57, 80, 25, −90, 9, 87, −43, −70, 70, 43, −87, −9, 90, −25, −80, 57,}
{56, −83, −16, 90, −28, −76, 66, 45, −87, −2, 88, −41, −69, 74, 33, −90, 11, 84, −52, −59, 81, 20, −91, 24, 79, −62, −48, 86, 7, −89, 37, 71, −71, −37, 89, −7, −86, 48, 62, −79, −24, 91, −20, −81, 59, 52, −84, −11, 90, −33, −74, 69, 41, −88, 2, 87, −45, −66, 76, 28, −90, 16, 83, −56,}
{54, −85, −4, 88, −46, −61, 82, 13, −90, 38, 67, −78, −22, 90, −31, −73, 73, 31, −90, 22, 78, −67, −38, 90, −13, −82, 61, 46, −88, 4, 85, −54, −54, 85, 4, −88, 46, 61, −82, −13, 90, −38, −67, 78, 22, −90, 31, 73, −73, −31, 90, −22, −78, 67, 38, −90, 13, 82, −61, −46, 88, −4, −85, 54,}
{52, −87, 7, 83, −62, −41, 90, −20, −76, 71, 28, −91, 33, 69, −79, −16, 89, −45, −59, 84, 2, −86, 56, 48, −88, 11, 81, −66, −37, 90, −24, −74, 74, 24, −90, 37, 66, −81, −11, 88, −48, −56, 86, −2, −84, 59, 45, −89, 16, 79, −69, −33, 91, −28, −71, 76, 20, −90, 41, 62, −83, −7, 87, −52,}
{50, −89, 18, 75, −75, −18, 89, −50, −50, 89, −18, −75, 75, 18, −89, 50, 50, −89, 18, 75, −75, −18, 89, −50, −50, 89, −18, −75, 75, 18, −89, 50, 50, −89, 18, 75, −75, −18, 89, −50, −50, 89, −18, −75, 75, 18, −89, 50, 50, −89, 18, 75, −75, −18, 89, −50, −50, 89, −18, −75, 75, 18, −89, 50,}
{48, −90, 28, 66, −84, 7, 79, −74, −16, 87, −59, −37, 91, −41, −56, 88, −20, −71, 81, 2, −83, 69, 24, −89, 52, 45, −90, 33, 62, −86, 11, 76, −76, −11, 86, −62, −33, 90, −45, −52, 89, −24, −69, 83, −2, −81, 71, 20, −88, 56, 41, −91, 37, 59, −87, 16, 74, −79, −7, 84, −66, −28, 90, −48,}
{46, −90, 38, 54, −90, 31, 61, −88, 22, 67, −85, 13, 73, −82, 4, 78, −78, −4, 82, −73, −13, 85, −67, −22, 88, −61, −31, 90, −54, −38, 90, −46, −46, 90, −38, −54, 90, −31, −61, 88, −22, −67, 85, −13, −73, 82, −4, −78, 78, 4, −82, 73, 13, −85, 67, 22, −88, 61, 31, −90, 54, 38, −90, 46,}
{45, −91, 48, 41, −90, 52, 37, −90, 56, 33, −89, 59, 28, −88, 62, 24, −87, 66, 20, −86, 69, 16, −84, 71, 11, −83, 74, 7, −81, 76, 2, −79, 79, −2, −76, 81, −7, −74, 83, −11, −71, 84, −16, −69, 86, −20, −66, 87, −24, −62, 88, −28, −59, 89, −33, −56, 90, −37, −52, 90, −41, −48, 91, −45,}
{43, −90, 57, 25, −87, 70, 9, −80, 80, −9, −70, 87, −25, −57, 90, −43, −43, 90, −57, −25, 87, −70, −9, 80, −80, 9, 70, −87, 25, 57, −90, 43, 43, −90, 57, 25, −87, 70, 9, −80, 80, −9, −70, 87, −25, −57, 90, −43, −43, 90, −57, −25, 87, −70, −9, 80, −80, 9, 70, −87, 25, 57, −90, 43,}
{41, −89, 66, 11, −79, 83, −20, −59, 90, −48, −33, 87, −71, −2, 74, −86, 28, 52, −91, 56, 24, −84, 76, −7, −69, 88, −37, −45, 90, −62, −16, 81, −81, 16, 62, −90, 45, 37, −88, 69, 7, −76, 84, −24, −56, 91, −52, −28, 86, −74, 2, 71, −87, 33, 48, −90, 59, 20, −83, 79, −11, −66, 89, −41,}

{38, −88, 73, −4, −67, 90, −46, −31, 85, −78, 13, 61, −90, 54, 22, −82, 82, −22, −54, 90, −61, −13, 78, −85, 31, 46, −90, 67, 4, −73, 88, −38, −38, 88, −73, 4, 67, −90, 46, 31, −85, 78, −13, −61, 90, −54, −22, 82, −82, 22, 54, −90, 61, 13, −78, 85, −31, −46, 90, −67, −4, 73, −88, 38,}
{37, −86, 79, −20, −52, 90, −69, 2, 66, −90, 56, 16, −76, 87, −41, −33, 84, −81, 24, 48, −89, 71, −7, −62, 91, −59, −11, 74, −88, 45, 28, −83, 83, −28, −45, 88, −74, 11, 59, −91, 62, 7, −71, 89, −48, −24, 81, −84, 33, 41, −87, 76, −16, −56, 90, −66, −2, 69, −90, 52, 20, −79, 86, −37,}
{36, −83, 83, −36, −36, 83, −83, 36, 36, −83, 83, −36, −36, 83, −83, 36, 36, −83, 83, −36, −36, 83, −83, 36, 36, −83, 83, −36, −36, 83, −83, 36, 36, −83, 83, −36, −36, 83, −83, 36, 36, −83, 83, −36, −36, 83, −83, 36, 36, −83, 83, −36, −36, 83, −83, 36, 36, −83, 83, −36, −36, 83, −83, 36,}
{33, −81, 87, −48, −16, 71, −90, 62, −2, −59, 90, −74, 20, 45, −86, 83, −37, −28, 79, −88, 52, 11, −69, 91, −66, 7, 56, −89, 76, −24, −41, 84, −84, 41, 24, −76, 89, −56, −7, 66, −91, 69, −11, −52, 88, −79, 28, 37, −83, 86, −45, −20, 74, −90, 59, 2, −62, 90, −71, 16, 48, −87, 81, −33,}
{31, −78, 90, −61, 4, 54, −88, 82, −38, −22, 73, −90, 67, −13, −46, 85, −85, 46, 13, −67, 90, −73, 22, 38, −82, 88, −54, −4, 61, −90, 78, −31, −31, 78, −90, 61, −4, −54, 88, −82, 38, 22, −73, 90, −67, 13, 46, −85, 85, −46, −13, 67, −90, 73, −22, −38, 82, −88, 54, 4, −61, 90, −78, 31,}
{28, −74, 91, −71, 24, 33, −76, 90, −69, 20, 37, −79, 90, −66, 16, 41, −81, 89, −62, 11, 45, −83, 88, −59, 7, 48, −84, 87, −56, 2, 52, −86, 86, −52, −2, 56, −87, 84, −48, −7, 59, −88, 83, −45, −11, 62, −89, 81, −41, −16, 66, −90, 79, −37, −20, 69, −90, 76, −33, −24, 71, −91, 74, −28,}
{25, −70, 90, −80, 43, 9, −57, 87, −87, 57, −9, −43, 80, −90, 70, −25, −25, 70, −90, 80, −43, −9, 57, −87, 87, −57, 9, 43, −80, 90, −70, 25, 25, −70, 90, −80, 43, 9, −57, 87, −87, 57, −9, −43, 80, −90, 70, −25, −25, 70, −90, 80, −43, −9, 57, −87, 87, −57, 9, 43, −80, 90, −70, 25,}
{24, −66, 88, −86, 59, −16, −33, 71, −90, 83, −52, 7, 41, −76, 91, −79, 45, 2, −48, 81, −90, 74, −37, −11, 56, −84, 89, −69, 28, 20, −62, 87, −87, 62, −20, −28, 69, −89, 84, −56, 11, 37, −74, 90, −81, 48, −2, −45, 79, −91, 76, −41, −7, 52, −83, 90, −71, 33, 16, −59, 86, −88, 66, −24,}
{22, −61, 85, −90, 73, −38, −4, 46, −78, 90, −82, 54, −13, −31, 67, −88, 88, −67, 31, 13, −54, 82, −90, 78, −46, 4, 38, −73, 90, −85, 61, −22, −22, 61, −85, 90, −73, 38, 4, −46, 78, −90, 82, −54, 13, 31, −67, 88, −88, 67, −31, −13, 54, −82, 90, −78, 46, −4, −38, 73, −90, 85, −61, 22,}
{20, −56, 81, −91, 83, −59, 24, 16, −52, 79, −90, 84, −62, 28, 11, −48, 76, −90, 86, −66, 33, 7, −45, 74, −89, 87, −69, 37, 2, −41, 71, −88, 88, −71, 41, −2, −37, 69, −87, 89, −74, 45, −7, −33, 66, −86, 90, −76, 48, −11, −28, 62, −84, 90, −79, 52, −16, −24, 59, −83, 91, −81, 56, −20,}
{18, −50, 75, −89, 89, −75, 50, −18, −18, 50, −75, 89, −89, 75, −50, 18, 18, −50, 75, −89, 89, −75, 50, −18, −18, 50, −75, 89, −89, 75, −50, 18, 18, −50, 75, −89, 89, −75, 50, −18, −18, 50, −75, 89, −89, 75, −50, 18, 18, −50, 75, −89, 89, −75, 50, −18, −18, 50, −75, 89, −89, 75, −50, 18,}
{16, −45, 69, −84, 91, −86, 71, −48, 20, 11, −41, 66, −83, 90, −87, 74, −52, 24, 7, −37, 62, −81, 90, −88, 76, −56, 28, 2, −33, 59, −79, 89, −89, 79, −59, 33, −2, −28, 56, −76, 88, −90, 81, −62, 37, −7, −24, 52, −74, 87, −90, 83, −66, 41, −11, −20, 48, −71, 86, −91, 84, −69, 45, −16,}
{13, −38, 61, −78, 88, −90, 85, −73, 54, −31, 4, 22, −46, 67, −82, 90, −90, 82, −67, 46, −22, −4, 31, −54, 73, −85, 90, −88, 78, −61, 38, −13, −13, 38, −61, 78, −88, 90, −85, 73, −54, 31, −4, −22, 46, −67, 82, −90, 90, −82, 67, −46, 22, 4, −31, 54, −73, 85, −90, 88, −78, 61, −38, 13,}
{11, −33, 52, −69, 81, −88, 91, −87, 79, −66, 48, −28, 7, 16, −37, 56, −71, 83, −89, 90, −86, 76, −62, 45, −24, 2, 20, −41, 59, −74, 84, −90, 90, −84, 74, −59, 41, −20, −2, 24, −45, 62, −76, 86, −90, 89, −83, 71, −56, 37, −16, −7, 28, −48, 66, −79, 87, −91, 88, −81, 69, −52, 33, −11,}
{9, −25, 43, −57, 70, −80, 87, −90, 90, −87, 80, −70, 57, −43, 25, −9, −9, 25, −43, 57, −70, 80, −87, 90, −90, 87, −80, 70, −57, 43, −25, 9, 9, −25, 43, −57, 70, −80, 87, −90, 90, −87, 80, −70, 57, −43, 25, −9, −9, 25, −43, 57, −70, 80, −87, 90, −90, 87, −80, 70, −57, 43, −25, 9,}
{7, −20, 33, −45, 56, −66, 74, −81, 86, −89, 91, −90, 87, −83, 76, −69, 59, −48, 37, −24, 11, 2, −16, 28, −41, 52, −62, 71, −79, 84, −88, 90, −90, 88, −84, 79, −71, 62, −52, 41, −28, 16, −2, −11, 24, −37, 48, −59, 69, −76, 83, −87, 90, −91, 89, −86, 81, −74, 66, −56, 45, −33, 20, −7,}
{4, −13, 22, −31, 38, −46, 54, −61, 67, −73, 78, −82, 85, −88, 90, −90, 90, −90, 88, −85, 82, −78, 73, −67, 61, −54, 46, −38, 31, −22, 13, −4, −4, 13, −22, 31, −38, 46, −54, 61, −67, 73, −78, 82, −85, 88, −90, 90, −90, 90, −88, 85, −82, 78, −73, 67, −61, 54, −46, 38, −31, 22, −13, 4,}
{2, −7, 11, −16, 20, −24, 28, −33, 37, −41, 45, −48, 52, −56, 59, −62, 66, −69, 71, −74, 76, −79, 81, −83, 84, −86, 87, −88, 89, −90, 90, −91, 91, −90, 90, −89, 88, −87, 86, −84, 83, −81, 79, −76, 74, −71, 69, −66, 62, −59, 56, −52, 48, −45, 41, −37, 33, −28, 24, −20, 16, −11, 7, −2,}

Figure 3:
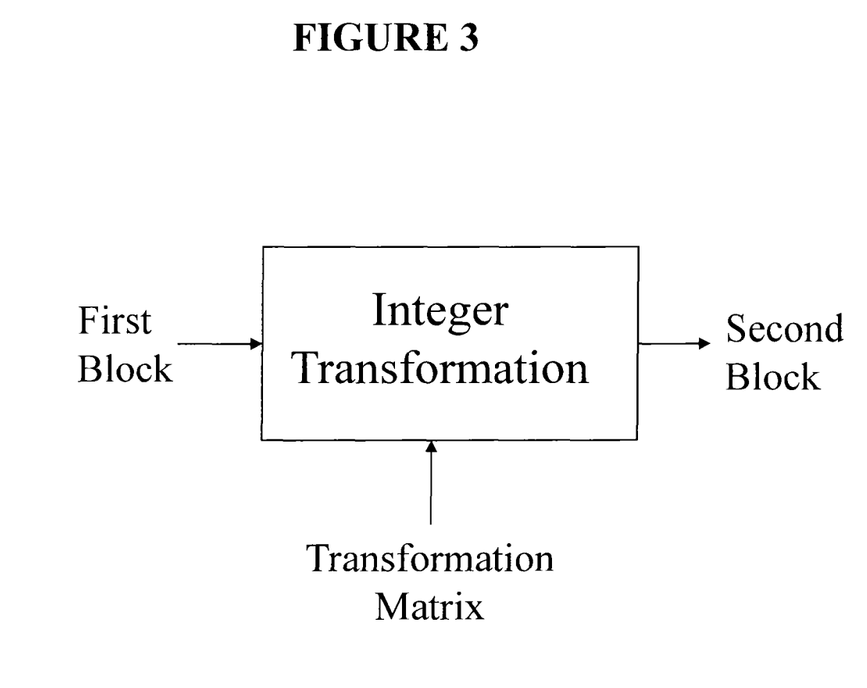
FIG. 3 is a block diagram representing the transform process flow employed in the exemplary embodiments.

FIG. 3 illustrates a process flow for performing the video coding or decoding in a schematic representation. A first block of residual pixel values can be subjected to a transformation by a transform matrix formed by a number of basis vectors, to generate a corresponding second block of residual pixel values of a moving picture. For the transformation, a transform matrix is used, as described above. The invention is applicable to any transform size. It is also not limited to close approximation to DCT. The approximation may be to other optimal basis vectors like the KLT.

Figure 4:
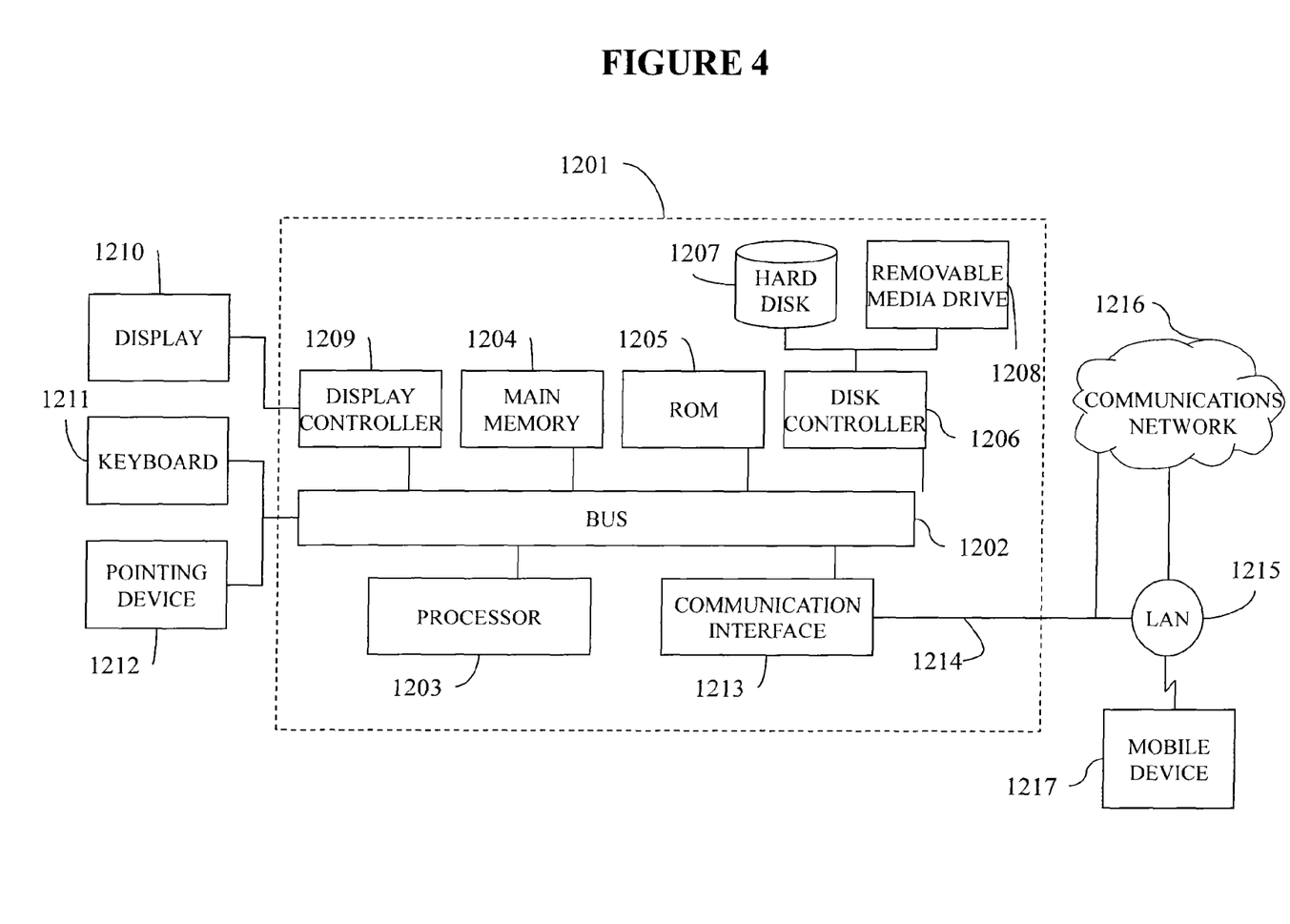
FIG. 4 is a block diagram of an exemplary image processing device that can be used to perform or implement the method, device and computer program product that employs the transformation encoding and/or decoding described herein.

FIG. 4 illustrates a computer system 1201 upon which the method of video coding or decoding of the present invention may be implemented. For example, the computer system 1201 may be used to implement a video conferencing endpoint that employs a video encoder and decoder that implement the teachings of the present disclosure. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203 for the coding or encoding. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203. The transformation can be performed on the processor 1203 by using the main memory 1204 for data storage during processing.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA). The storage devices can be used to store results of the coding/decoding or data that has to be transformed, and to store the basic vectors of the transform matrix.

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)). With such special purpose logic devices, the transformation with the transform matrix can be hardware-coded to speed up the encoding or coding of the moving pictures, and to reduce the processing required on processor 1203.

The computer system 1201 may also include a display controller 1209 coupled to the bus 1202 to control a display 1210, such as a cathode ray tube (CRT), for displaying information to a computer user. Results of the coding or decoding of a moving picture can be displayed on display 1210. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the transformation in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions, as described above with respect to the special purpose logic devices. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. For example the basic vectors and moving pictures that have to be coded or decoded can be stored on such computer readable media. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the method of video coding or decoding, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the method of video coding or decoding remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information. For example, the communication interface 1213 can be used to output coded moving pictures resulting from the method of video coding, or to input encoded moving pictures to process them with the method for decoding.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. It is possible to deliver coded video data that was coded by the method of the present invention to external devices, in an MPEG* or H.26* standard, for example a mobile device 1217, or other terminal devices connected to network 1216. Due to the data reduction by encoding, the required bandwidth could be reduced. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

The present invention is useful to design integer transforms for image and video coding with improved coding efficiency and lower complexity compared to previously used integer transforms.

Although aspects of the invention have been described with reference to particular embodiments, it is to be understood that these embodiments are merely illustrative of the principles and applications of the present invention. It is therefore to be understood that numerous modifications may be made to the illustrative embodiment and that other arrangements may be devised without departing from the spirit and scope of the present invention as defined by the appended claims.

The invention claimed is:

1. A video decoding method comprising:
   receiving from a video encoder a bit stream representing encoded video images;
   inverse quantizing the bit stream according to quantization performed by the video encoder to produce inverse quantized data;
   inverse transforming the inverse quantized data that includes a first block of residual pixel values, by a transform matrix having a plurality of basis vectors to produce a corresponding second block of residual pixel values for a video image,
   wherein the transform matrix:
      consists of integer elements,
      has basis vectors derived from a DCT,
      has a DC vector,
      not all of the basis vectors being orthogonal but all of the basis vectors being within a predetermined deviation of the DC vector,
      none of the basis vectors have a norm that differs more than 0.0015 from a norm of the DC vector,
      having a maximum element deviation from said DCT less than or equal to 0.05, and each integer element being represented in one byte, and
      wherein any inner product between two of the basis vectors is less than 0.003.

2. The method according to claim 1, wherein said transform matrix is a 4×4 transform matrix and having basis vectors defined as:
{64, 64, 64, 64,}
{83, 36, −36, −83,}
{64, −64, −64, 64,}
{36, −83, 83, −36,}.

3. The method according to claim 1, wherein said transform matrix is a 8×8 transform matrix and having basis vector defined as:
{64, 64, 64, 64, 64, 64, 64, 64,}
{89, 75, 50, 18, −18, −50, −75, −89,}
{83, 36, −36, −83, −83, −36, 36, 83,}
{75, −18, −89, −50, 50, 89, 18, −75,}
{64, −64, −64, 64, 64, −64, −64, 64,}
{50, −89, 18, 75, −75, −18, 89, −50,}
{36, −83, 83, −36, −36, 83, −83, 36,}
{18, −50, 75, −89, 89, −75, 50, −18,}.

4. The method according to claim 1, wherein said transform matrix is a 16×16 transform matrix and having basis vector defined as:
{64, 64, 64, 64, 64, 64, 64, 64, 64, 64, 64, 64, 64, 64, 64, 64,}
{90, 87, 80, 70, 57, 43, 25, 9, −9, −25, −43, −57, −70, −80, −87, −90,}
{89, 75, 50, 18, −18, −50, −75, −89, −89, −75, −50, −18, 18, 50, 75, 89,}
{87, 57, 9, −43, −80, −90, −70, −25, 25, 70, 90, 80, 43, −9, −57, −87,}
{83, 36, −36, −83, −83, −36, 36, 83, 83, 36, −36, −83, −83, −36, 36, 83,}
{80, 9, −70, −87, −25, 57, 90, 43, −43, −90, −57, 25, 87, 70, −9, −80,}
{75, −18, −89, −50, 50, 89, 18, −75, −75, 18, 89, 50, −50, −89, −18, 75,}
{70, −43, −87, 9, 90, 25, −80, −57, 57, 80, −25, −90, −9, 87, 43, −70,}
{64, −64, −64, 64, 64, −64, −64, 64, 64, −64, −64, 64, 64, −64, −64, 64,}
{57, −80, −25, 90, −9, −87, 43, 70, −70, −43, 87, 9, −90, 25, 80, −57,}
{50, −89, 18, 75, −75, −18, 89, −50, −50, 89, −18, −75, 75, 18, −89, 50,}
{43, −90, 57, 25, −87, 70, 9, −80, 80, −9, −70, 87, −25, −57, 90, −43,}
{36, −83, 83, −36, −36, 83, −83, 36, 36, −83, 83, −36, −36, 83, −83, 36,}
{25, −70, 90, −80, 43, 9, −57, 87, −87, 57, −9, −43, 80, −90, 70, −25,}
{18, −50, 75, −89, 89, −75, 50, −18, −18, 50, −75, 89, −89, 75, −50, 18,}
{9, −25, 43, −57, 70, −80, 87, −90, 90, −87, 80, −70, 57, −43, 25, −9,}.

5. A video decoder comprising:
a communication interface configured to receive from a video encoder a bit stream representing encoded video images;
a non-transitory computer readable storage device having stored therein a transform matrix having a plurality of basis vectors; and
a processing device including circuitry configured to inverse quantize the bit stream according to quantization performed by the video encoder to produce inverse quantized data, and to inverse transform the inverse quantized data that includes a first block of residual values, by the transform matrix to produce a corresponding second block of residual pixel values for a video image,
wherein the transform matrix
consists of integer elements,
has basis vectors derived from a DCT,
has a DC vector,
not all of the basis vectors being orthogonal but all of the basis vectors being within a predetermined deviation of the DC vector,
none of the basis vectors have a norm that differs more than 0.0015 from a norm of the DC vector,
having a maximum element deviation from said DCT less than or equal to 0.05, and each integer element being represented in one byte, and
wherein any inner product between two of the basis vectors is less than 0.003.

6. The video decoder of claim 5, wherein said transform matrix is a 4×4 transform matrix and having basis vectors defined as:
{64, 64, 64, 64,}
{83, 36, −36, −83,}
{64, −64, −64, 64,}
{36, −83, 83, −36,}.

7. The video decoder of claim 5, wherein said transform matrix is a 8×8 transform matrix and having basis vectors defined as:
{64, 64, 64, 64, 64, 64, 64, 64,}
{89, 75, 50, 18, −18, −50, −75, −89,}
{83, 36, −36, −83, −83, −36, 36, 83,}
{75, −18, −89, −50, 50, 89, 18, −75,}
{64, −64, −64, 64, 64, −64, −64, 64,}
{50, −89, 18, 75, −75, −18, 89, −50,}
{36, −83, 83, −36, −36, 83, −83, 36,}
{18, −50, 75, −89, 89, −75, 50, −18,}.

8. The video decoder of claim 5, wherein said transform matrix is a 16×16 transform matrix and having basis vectors defined as:
{64, 64, 64, 64, 64, 64, 64, 64, 64, 64, 64, 64, 64, 64, 64, 64,}
{90, 87, 80, 70, 57, 43, 25, 9, −9, −25, −43, −57, −70, −80, −87, −90,}
{89, 75, 50, 18, −18, −50, −75, −89, −89, −75, −50, −18, 18, 50, 75, 89,}
{87, 57, 9, −43, −80, −90, −70, −25, 25, 70, 90, 80, 43, −9, −57, −87,}
{83, 36, −36, −83, −83, −36, 36, 83, 83, 36, −36, −83, −83, −36, 36, 83,}
{80, 9, −70, −87, −25, 57, 90, 43, −43, −90, −57, 25, 87, 70, −9, −80,}
{75, −18, −89, −50, 50, 89, 18, −75, −75, 18, 89, 50, −50, −89, −18, 75,}
{70, −43, −87, 9, 90, 25, −80, −57, 57, 80, −25, −90, −9, 87, 43, −70,}
{64, −64, −64, 64, 64, −64, −64, 64, 64, −64, −64, 64, 64, −64, −64, 64,}
{57, −80, −25, 90, −9, −87, 43, 70, −70, −43, 87, 9, −90, 25, 80, −57,}
{50, −89, 18, 75, −75, −18, 89, −50, −50, 89, −18, −75, 75, 18, −89, 50,}
{43, −90, 57, 25, −87, 70, 9, −80, 80, −9, −70, 87, −25, −57, 90, −43,}
{36, −83, 83, −36, −36, 83, −83, 36, 36, −83, 83, −36, −36, 83, −83, 36,}
{25, −70, 90, −80, 43, 9, −57, 87, −87, 57, −9, −43, 80, −90, 70, −25,}
{18, −50, 75, −89, 89, −75, 50, −18, −18, 50, −75, 89, −89, 75, −50, 18,}
{9, −25, 43, −57, 70, −80, 87, −90, 90, −87, 80, −70, 57, −43, 25, −9,}.

9. A non-transitory computer readable storage device having computer readable instructions stored therein that when executed by a processor perform a video decoder method comprising:
receiving from a video encoder a bit stream representing encoded video images;
inverse quantizing the bit stream according to quantization performed by the video encoder to produce inverse quantized data;
inverse transforming the inverse quantized data that includes a first block of residual pixel values, by a transform matrix having a plurality of basis vectors to produce a corresponding second block of residual pixel values for a video image,
wherein the transform matrix
consists of integer elements,
has basis vectors derived from a DCT,
has a DC vector,
not all of the basis vectors being orthogonal but all of the basis vectors being within a predetermined deviation of the DC vector,
none of the basis vectors have a norm that differs more than 0.0015 from a norm of the DC vector,
having a maximum element deviation from said DCT less than or equal to 0.05, and each integer element being represented in one byte, and
wherein any inner product between two of the basis vectors is less than 0.003.

10. The computer readable storage device of claim 9, wherein said transform matrix is a 4×4 transform matrix and having basis vectors defined as:
{64, 64, 64, 64,}
{83, 36, −36, −83,}
{64, −64, −64, 64,}
{36, −83, 83, −36,}.

11. The computer readable storage device of claim 9, wherein said transform matrix is a 8×8 transform matrix and having basis vectors defined as:
{64, 64, 64, 64, 64, 64, 64, 64,}
{89, 75, 50, 18, −18, −50, −75, −89,}
{83, 36, −36, −83, −83, −36, 36, 83,}
{75, −18, −89, −50, 50, 89, 18, −75,}
{64, −64, −64, 64, 64, −64, −64, 64,}
{50, −89, 18, 75, −75, −18, 89, −50,}
{36, −83, 83, −36, −36, 83, −83, 36,}
{18, −50, 75, −89, 89, −75, 50, −18,}.

12. The computer readable storage device of claim 9, wherein said transform matrix is a 16×16 transform matrix and having basis vectors defined as:
{64, 64, 64, 64, 64, 64, 64, 64, 64, 64, 64, 64, 64, 64, 64, 64,}

{90, 87, 80, 70, 57, 43, 25, 9, −9, −25, −43, −57, −70, −80, −87, −90,}
{89, 75, 50, 18, −18, −50, −75, −89, −89, −75, −50, −18, 18, 50, 75, 89,}
{87, 57, 9, −43, −80, −90, −70, −25, 25, 70, 90, 80, 43, −9, −57, −87,}
{83, 36, −36, −83, −83, −36, 36, 83, 83, 36, −36, −83, −83, −36, 36, 83,}
{80, 9, −70, −87, −25, 57, 90, 43, −43, −90, −57, 25, 87, 70, −9, −80,}
{75, −18, −89, −50, 50, 89, 18, −75, −75, 18, 89, 50, −50, −89, −18, 75,}
{70, −43, −87, 9, 90, 25, −80, −57, 57, 80, −25, −90, −9, 87, 43, −70,}
{64, −64, −64, 64, 64, −64, −64, 64, 64, −64, −64, 64, 64, −64, −64, 64,}
{57, −80, −25, 90, −9, −87, 43, 70, −70, −43, 87, 9, −90, 25, 80, −57,}
{50, −89, 18, 75, −75, −18, 89, −50, −50, 89, −18, −75, 75, 18, −89, 50,}
{43, −90, 57, 25, −87, 70, 9, −80, 80, −9, −70, 87, −25, −57, 90, −43,}
{36, −83, 83, −36, −36, 83, −83, 36, 36, −83, 83, −36, −36, 83, −83, 36,}
{25, −70, 90, −80, 43, 9, −57, 87, −87, 57, −9, −43, 80, −90, 70, −25,}
{18, −50, 75, −89, 89, −75, 50, −18, −18, 50, −75, 89, −89, 75, −50, 18,}
{9, −25, 43, −57, 70, −80, 87, −90, 90, −87, 80, −70, 57, −43, 25, −9,}.

13. A method of video coding comprising:
obtaining a sequence of video frames to be encoded;
transforming a first block of residual pixel values of a video frame, by a transform matrix having a plurality of basis vectors, to produce a corresponding second block of residual pixel values,
wherein the transform matrix
consists of integer elements,
has basis vectors derived from DCT,
has a DC vector,
not all of the basis vectors being orthogonal but all of the basis vectors being within a predetermined deviation of the DC vector,
none of the basis vectors have a norm that differs more than 0.0015 from a norm of the DC vector,
having a maximum element deviation from said DCT less than or equal to 0.05, and each integer element being represented in one byte, and
wherein any inner product between two of the basis vectors is less than 0.003;
quantizing the second block of residual pixel values to produce quantized data;
entropy coding the quantized data to produce an encoded bit stream to be sent to a decoder.

14. The method according to claim 13, wherein said transform matrix is a 4×4 transform matrix and having basis vectors defined as:
{64, 64, 64, 64,}
{83, 36, −36, −83,}
{64, −64, −64, 64,}
{36, −83, 83, −36,}.

15. The method according to claim 13, wherein said transform matrix is a 8×8 transform matrix and having basis vectors defined as:
{64, 64, 64, 64, 64, 64, 64, 64,}
{89, 75, 50, 18, −18, −50, −75, −89,}
{83, 36, −36, −83, −83, −36, 36, 83,}
{75, −18, −89, −50, 50, 89, 18, −75,}
{64, −64, −64, 64, 64, −64, −64, 64,}
{50, −89, 18, 75, −75, −18, 89, −50,}
{36, −83, 83, −36, −36, 83, −83, 36,}
{18, −50, 75, −89, 89, −75, 50, −18,}.

16. The method according to claim 13, wherein said transform matrix is a 16×16 transform matrix and having basis vectors defined as:
{64, 64, 64, 64, 64, 64, 64, 64, 64, 64, 64, 64, 64, 64, 64, 64,}
{90, 87, 80, 70, 57, 43, 25, 9, −9, −25, −43, −57, −70, −80, −87, −90,}
{89, 75, 50, 18, −18, −50, −75, −89, −89, −75, −50, −18, 18, 50, 75, 89,}
{87, 57, 9, −43, −80, −90, −70, −25, 25, 70, 90, 80, 43, −9, −57, −87,}
{83, 36, −36, −83, −83, −36, 36, 83, 83, 36, −36, −83, −83, −36, 36, 83,}
{80, 9, −70, −87, −25, 57, 90, 43, −43, −90, −57, 25, 87, 70, −9, −80,}
{75, −18, −89, −50, 50, 89, 18, −75, −75, 18, 89, 50, −50, −89, −18, 75,}
{70, −43, −87, 9, 90, 25, −80, −57, 57, 80, −25, −90, −9, 87, 43, −70,}
{64, −64, −64, 64, 64, −64, −64, 64, 64, −64, −64, 64, 64, −64, −64, 64,}
{57, −80, −25, 90, −9, −87, 43, 70, −70, −43, 87, 9, −90, 25, 80, −57,}
{50, −89, 18, 75, −75, −18, 89, −50, −50, 89, −18, −75, 75, 18, −89, 50,}
{43, −90, 57, 25, −87, 70, 9, −80, 80, −9, −70, 87, −25, −57, 90, −43,}
{36, −83, 83, −36, −36, 83, −83, 36, 36, −83, 83, −36, −36, 83, −83, 36,}
{25, −70, 90, −80, 43, 9, −57, 87, −87, 57, −9, −43, 80, −90, 70, −25,}
{18, −50, 75, −89, 89, −75, 50, −18, −18, 50, −75, 89, −89, 75, −50, 18,}
{9, −25, 43, −57, 70, −80, 87, −90, 90, −87, 80, −70, 57, −43, 25, −9,}.

* * * * *